(12) United States Patent
Mueller

(10) Patent No.: US 9,906,019 B2
(45) Date of Patent: Feb. 27, 2018

(54) INTEGRATED SOLAR AND BATTERY INVERTER

(71) Applicant: SMA Solar Technology AG, Niestetal (DE)

(72) Inventor: Burkard Mueller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 951 days.

(21) Appl. No.: 14/277,944

(22) Filed: May 15, 2014

(65) Prior Publication Data

US 2014/0339898 A1 Nov. 20, 2014

(30) Foreign Application Priority Data

May 17, 2013 (DE) .................. 10 2013 105 098

(51) Int. Cl.
| | |
|---|---|
| H02J 1/00 | (2006.01) |
| H02M 7/42 | (2006.01) |
| H02M 1/10 | (2006.01) |
| H02M 3/158 | (2006.01) |
| H02J 3/38 | (2006.01) |

(Continued)

(52) U.S. Cl.
CPC ............ *H02J 1/00* (2013.01); *H02M 1/10* (2013.01); *H02M 3/158* (2013.01); *H02M 7/42* (2013.01); *H02J 3/383* (2013.01); *H02J 7/35* (2013.01); *H02J 2007/0059* (2013.01); *H02M 3/005* (2013.01); *H02M 7/48* (2013.01); *H02M 2001/007* (2013.01); *Y02E 10/563* (2013.01); *Y02E 10/566* (2013.01); *Y10T 307/50* (2015.04); *Y10T 307/549* (2015.04)

(58) Field of Classification Search
CPC .................... H02J 1/00; H02M 1/10
USPC .............................................. 307/52
See application file for complete search history.

(56) References Cited

U.S. PATENT DOCUMENTS

2011/0198921 A1* 8/2011 Sone .................. B60L 11/1887
307/10.1

FOREIGN PATENT DOCUMENTS

| | | | |
|---|---|---|---|
| EP | 2523339 A2 * | 11/2012 | ............ H02M 7/537 |
| WO | 2010047422 A2 | 4/2010 | |

(Continued)

OTHER PUBLICATIONS

Hamill, et al. "A Zero Ripple Technique Applicable to Any DC Converter." IEEE 1999.*

*Primary Examiner* — Rexford Barnie
*Assistant Examiner* — Joseph Inge
(74) *Attorney, Agent, or Firm* — Eschweiler & Potashnik, LLC

(57) ABSTRACT

A circuitry arrangement includes two-pole connectors for connecting a battery and a further voltage source. The plus pole of one connector and the minus pole of the other connector are directly connected to a plus pole and a minus pole of a DC voltage link. The plus and minus poles of the one connector are connected via a first parallel circuit of a switch and a diode and a first choke connected in series. The minus and plus poles of the other connector are connected via a second parallel circuit of a switch and a diode and a second choke connected in series. A connection between choke ends of the two parallel circuits is electrically conductive at least for alternating currents. The two chokes are magnetically coupled in that their winding senses on a common magnetic core are equal as viewed from the connection between the two parallel circuits.

15 Claims, 1 Drawing Sheet

(51) Int. Cl.
  *H02J 7/35*    (2006.01)
  *H02J 7/00*    (2006.01)
  *H02M 3/00*    (2006.01)
  *H02M 7/48*    (2007.01)
  *H02M 1/00*    (2006.01)

(56) References Cited

FOREIGN PATENT DOCUMENTS

WO    WO 2010047422 A2 *  4/2010  .......... B60L 11/1887
  WO         2011092774 A1    8/2011
  WO    WO 2011092774 A1 *  8/2011  ............... H02K 5/20

* cited by examiner

INTEGRATED SOLAR AND BATTERY INVERTER

REFERENCE TO RELATED APPLICATION

This application claims priority to German Application number 10 2013 105 098.0 filed on May 17, 2013.

FIELD

The present disclosure relates to a circuitry arrangement for connecting a battery and a further voltage source to a common DC voltage link. Further, the present disclosure relates to a photovoltaic power plant including such a circuitry arrangement, a battery and a photovoltaic generator as a further voltage source.

BACKGROUND

Various voltage sources by which regenerative electric power is locally generated have the drawback that the generated electric power fluctuates strongly as it, for example, depends on weather and time of day. This particularly applies to photovoltaic generators. It makes sense to use batteries as energy buffers to cope with these fluctuations of the available electric power.

A circuitry arrangement for connecting a battery and a further voltage source to a common DC voltage link comprising a two-pole connector for the battery and a two-pole connector for the further voltage source is known from WO 2010/047422 A2. Here, a minus pole of one of the two connectors and a plus pole of the other of the two connectors are directly connected with each other, and a common choke is connected between this connection point and a connection point connecting two parallel circuits each consisting of a switch and an anti-parallel diode oriented in blocking direction. The two parallel circuits form a half-bridge between the plus pole of the one of the two connectors and the minus pole of the other of the two connectors. When the switches of the two parallel circuits are not operated but permanently held open, a battery and a further voltage source which are connected to the two connectors are connected in series with regard to each other and connected in parallel to a link capacitor of the DC voltage link. Then, the sum of their output voltages is the link voltage of the DC voltage link, and upon putting a load to the DC voltage link, the DC voltage link is recharged by the battery and the further DC voltage source according to their output voltages. By operating the switches of the parallel circuits, however, a power flow between the battery and the further DC voltage link may also be effected. This power flow may then be superimposed with the power flow from the battery and the further DC voltage source into the DC voltage link. Further, the operation of the switches allows for boosting the output voltages of the battery and the further DC voltage link present at the two two-pole connectors. In the known circuitry arrangement, a fuel cell device is provided as the further voltage source, and an inverter for operating an electric drive motor is supplied out of the DC voltage link.

A further circuitry arrangement for connecting a battery and a further voltage source to a common DC voltage link comprising a two-pole connector for the battery and a two-pole connector for the further voltage source is known from DE 10 2011 075 658 A1. This circuitry arrangement, in addition to the above details known from WO 2010/047422 A2, comprises a buffer capacitor between the two poles of each of the two two-pole connectors. This known circuitry arrangement is intended for a photovoltaic power plant in which a solar cell module and a battery are connected to the two connectors. The buffer capacitors connected in series are used as a link capacitance of the common intermediate link. An inverter connected to the common intermediate link is supplied out of the DC voltage link and feeds into an AC power grid.

David C. Hamill and Philip T. Krein: A "Zero" Ripple Technique Applicable To Any DC Converter, IEEE 1999 (Power Electronics Specialists Conference, 1999. PESC 99. 30th Annual IEEE, Volume 2, pages 1165-1171) disclose a filter for ripple currents between two two-pole connectors in which a buffer capacitor is not directly, but via a first choke, connected to one pole of a DC voltage source. This choke is magnetically coupled to a second choke which is arranged in a line leading away from this pole. The second choke may be that one of a boost converter. Such a filter may also be provided at the output end of a buck converter and include its choke and an output side capacitor. Further, a Cuk-converter with a low current ripple is disclosed. This Cuk-converter is divided into two partial circuitries which are only connected via magnetically coupled chokes. Each of these chokes is further magnetically coupled with one of the usual chokes of the Cuk-converter, and it is connected in series with a capacitor in the respective partial circuitry.

Even the two chokes of a usual Cuk-converter are often magnetically coupled; and the power flow direction between two two-pole connectors via the capacitor can be inverted, if the switching elements on both sides of its capacitor are active switching elements.

WO 2011/092774 A1 discloses a circuitry arrangement for connecting two batteries to a common DC voltage link out of which, via a motor supplier circuitry, an electro motor, particularly a switched reluctance motor/generator, is supplied. The known circuitry arrangement comprises a two-pole connector for each of the two batteries. The plus pole of one connector is connected to the plus pole of the DC voltage link via a first choke and a first parallel circuit of a switch and an anti-parallel diode oriented in blocking direction; and a minus pole of the other connector is directly connected to the minus pole of the DC voltage link. The plus pole of the one connector is further connected with the plus pole of the other connector via the first choke and a second parallel circuit of a switch and an anti-parallel diode oriented in blocking direction and a second choke connected in series with the second parallel circuit, whereas the minus pole of the other connector is connected with the minus pole of the one connector via a third parallel circuit consisting of a switch and an anti-parallel diode oriented in blocking direction. Further, the minus pole of the one connector is connected with the plus pole of the other connector via a fourth parallel circuit consisting of a switch and an anti-parallel diode oriented in blocking direction and the second choke. The first and the second chokes are magnetically coupled in such a way that a current flowing from the plus pole of the one connector through the first choke causes a magnetic flux in the same direction through a common magnetic core as an electric current from the plus pole of the other connector through the second choke.

In one embodiment of the circuitry arrangement known from WO 2011/092774 A1, two capacitors are provided instead of two batteries. In this embodiment, the first and the second chokes, between the capacitors, are connected in series with the fourth parallel circuit consisting of the switch and the anti-parallel diode oriented in blocking direction.

There still is a need of a circuitry arrangement for connecting a battery and a further voltage source, particularly a photovoltaic generator, to a common DC voltage link, in which the battery, despite its simple integration, is not subjected to high ripple currents.

SUMMARY

The present disclosure provides a circuitry arrangement for connecting a battery and a further voltage source to a common DC voltage link. The circuitry arrangement comprises a DC voltage link having a plus pole and a minus pole, a two-pole connector for the battery, the connector for the battery having a plus pole and a minus pole, and a two-pole connector for the further voltage source, the connector for the further voltage source also having a plus pole and a minus pole. In one embodiment the plus pole of one of the two connectors is directly connected to the plus pole of the DC voltage link, and the minus pole of the other of the two connectors is directly connected to the minus pole of the DC voltage link. The plus pole of the one of the two connectors is connected to the minus pole of the one of the two connectors via a first parallel circuit comprising or consisting of a first switch and a first anti-parallel diode oriented in blocking direction and via a first choke connected in series with the first parallel circuit. The minus pole of the other of the two connectors is connected to the plus pole of the other of the two connectors via a second parallel circuit comprising or consisting of a second switch and a second anti-parallel diode oriented in blocking direction and via a second choke connected in series with the second parallel circuit. A connection that is electrically conductive at least for alternating currents is provided between a choke end of the first parallel circuit and a choke end of the second parallel circuit. The first choke and the second choke are magnetically coupled, wherein winding senses of windings of the first choke and the second choke on a common magnetic core are equal as viewed from the connection of the choke ends of the first parallel circuit and the second parallel circuit.

Further, the present disclosure provides a photovoltaic power plant comprising a battery, a further DC voltage source, a circuitry arrangement according to the present disclosure connecting the battery and the further voltage source to a common DC voltage link, and an inverter connected to the DC voltage link. The inverter is supplied out of the DC voltage link and configured to feed an alternating current into an AC power grid.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

Figure 1:
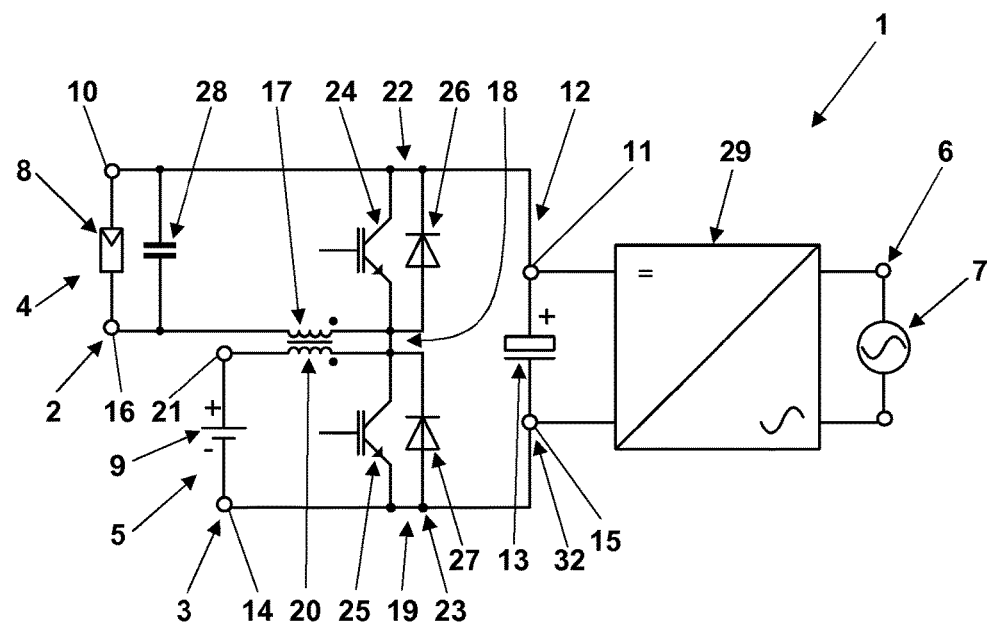
FIG. 1 is a principle circuit diagram of a first embodiment of the circuitry arrangement of the present disclosure.

A circuitry arrangement for connecting a battery and a further voltage source to a common DC voltage link according to the present disclosure comprises a two-pole connector for the battery and a two-pole connector for the further voltage source. A plus pole of the one connector and a minus pole of the other connector are directly connected to a plus pole and a minus pole of the DC voltage link. Further, the plus pole of the one connector is connected to a minus pole of the one connector via a parallel circuit comprising or consisting of a switch and an anti-parallel diode oriented in blocking direction and via a choke connected in series with this parallel circuit. Similarly, the minus pole of the other connector is connected to a plus pole of the other connector via another parallel circuit comprising or consisting of a switch and an anti-parallel diode oriented in blocking direction and via another choke connected in series with the other parallel circuit. The two chokes are magnetically coupled, a choke end of the one parallel circuit and a choke end of the other parallel circuit are connected via a connection which is electrically conductive at least for alternating currents.

The fact that the anti-parallel diode connecting the plus pole and the minus pole of the one or other connector in parallel to the switch and in series with the choke is oriented in blocking direction, regularly means that its cathode is connected to the plus pole of the respective connector.

The choke end of the one parallel circuit and the choke end of the other parallel circuit are those ends of the parallel circuits which are closer to the respective choke and which are regularly directly connected to the respective choke.

The magnetically coupled electric elements designated as chokes or as the one and the other chokes or as the first and the second chokes here, may alternatively be described as a single choke with two magnetically coupled choke windings. Outside of this paragraph, however, the term "choke" is always used here to designate an electric element with one choke winding only.

In a circuitry arrangement according to the present disclosure, the battery and the further DC voltage link are not directly connected in series with each other. Thus, each current flowing towards the battery must flow through at least one of the two chokes, no matter to which of the two connectors the battery is connected. According to the present disclosure, the battery is not only protected against ripple currents by this choke but also by its magnetic coupling to the other choke. This is achieved in one embodiment by a same winding sense of both chokes as viewed from the choke ends of the two parallel circuits. In theory, a complete suppression of any ripple current into the battery may be achieved if the choke connected to the battery has a higher winding number than the choke connected to the further voltage source, a transfer factor of the magnetically coupled chokes being equal to a leakage inductance of the coupled chokes divided by a main inductance of the magnetically coupled chokes plus 1. As long as these two values are essentially equal, i.e. if they do not differ by more than 10%, the protection of the battery against ripple currents may be achieved by a small and thus low-cost chokes. Then, there is no need to be considerate of the battery, i. e. its sensitivity with regard to ripple currents, when operating the switches of the two parallel circuits. Even an operation of the switches in a quasi-resonant mode with zero load switching and correspondingly reduced switching losses of the switches is possible.

The circuitry arrangement according to the present disclosure essentially differs from the prior art according to David C. Hamill and Philip T. Krein in that the battery, in the circuitry arrangement of the present disclosure, is connected to the coupled chokes there where, according to this prior art, a buffer capacitor is arranged.

From a bidirectional Cuk-converter with magnetically coupled chokes, the circuitry arrangement of the present disclosure differs by its connection to a DC voltage link which has a link capacitor at another place than a usual capacitor of a Cuk-converter. In fact, it is even the case that, if the one and the other parallel circuit are not connected directly but via a capacitor which might be compared to a capacitor of a Cuk-converter, a further DC/DC converter is provided between this capacitor and the link capacitor of the circuitry arrangement of the present disclosure which is not existing in a Cuk-converter.

When an additional buffer capacitor is provided in the circuitry arrangement of the present disclosure, it may be connected between the plus pole and the minus pole of one of the two connectors or between the minus poles or the plus poles of both connectors. Due to the high capacitance of the DC voltage link, these two variants of connecting the buffer capacitor essentially have the same function. If a buffer capacitor is provided in a circuitry arrangement according to the present disclosure, it is, however, in one embodiment not connected to the pole of the connector for the battery which is connected to one of the coupled chokes. This means that the buffer capacitor is preferably not operating in parallel to the battery but to the further voltage source in one embodiment. Due to the low internal resistance of the battery, a buffer capacitor connected in parallel to the battery would have to have a much higher capacitance to achieve the same filter effect.

Typically, an inverter is connected to the DC voltage link which is supplied out of the DC voltage link and which is provided for feeding an alternating current into an AC power grid. This inverter may generally even be bidirectional so that it may charge the DC voltage link out of the AC power grid. The circuitry arrangement according to the present disclosure may use this charging of the DC voltage link for charging the battery.

The circuitry arrangement of the present disclosure may have at least one additional two-pole connector for an additional DC voltage source which is directly—or via a DC/DC converter—connected to the DC voltage link. Further, an additional two-pole connector may be provided which is connected to the connector for the battery or the further voltage source via a DC/DC converter.

A photovoltaic power plant according to the present disclosure and comprising a circuitry arrangement according to the present disclosure further comprises a battery and a photovoltaic generator as the further voltage source, and, as a rule, also the already mentioned inverter for feeding electric energy out of the DC voltage link of the circuitry arrangement into an AC power grid.

Now referring in greater detail to the drawings, the circuitry arrangement 1 depicted in FIG. 1 comprises two two-pole connectors 2 and 3 for two DC voltage sources 4 and 5, and an output connector 6 for connection to an AC power grid 7. The DC voltage source 4 is a photovoltaic generator 8, here. The other DC voltage source 5 is a battery 9, here. A plus pole 10 of the one connector 2 is directly connected to a plus pole 11 of the DC voltage link 12 comprising a link capacitor 13. Similarly, a minus pole 14 of the other connector 3 is directly connected to a minus pole 15 of the DC voltage link 12. A minus pole 16 of the one connector 2 is connected to a center point 18 of a half bridge 19 via a choke 17. A plus pole 21 of the other connector 3 is also connected to this center point 18 via another choke 20 which is magnetically coupled to the choke 17. The half bridge 19, on each side of the center point 18, comprises or consists of a parallel circuit 22 or 23, respectively, including a switch 24 or 25, respectively, and a diode 26 or 27, respectively. The diodes 26 and 27 are oriented in an anti-parallel direction with regard to the direction of the current switched with the switches 24 and 25. Thus, they are oriented in blocking direction with regard to the connected plus pole 10 and minus pole 14.

A buffer capacitor 28 is connected between the plus pole 10 and the minus pole 16 of the connector 2. This buffer capacitor 28 could alternatively be connected between the minus pole 16 of the connector 2 and the minus pole 14 of the connector 3, and due to the much higher capacitance of the link capacitor 13 it would have the same effect with regard to the battery 9. Particularly, this effect relates to protecting the battery 9 against ripple currents. Mainly, this protection against ripple currents, however, is provided by the coupled chokes 20 and 17 which smoothen any current flowing in the battery 9, as this current has at least to flow through the choke 20.

As long as the switches 24 and 25 are open, the DC voltage link 12 is charged by the both DC voltage sources 4 and 5, wherein a link voltage of the DC voltage link 12 is additively made up by the output voltages of the DC voltage sources 4 and 5. When an inverter 29 is supplied out of the DC voltage link 12 to feed an alternating current into the AC power grid 7, both DC voltage sources 4 and 5 are loaded for recharging the DC voltage link 12. By means of operating the switches 24 and 25, the output voltages of the DC voltage sources 4 and 5 may be boosted to charge the intermediate link up to a desired voltage, and even a power flow from the photovoltaic generator 8 into the battery 9 may be caused. With a bidirectional embodiment of the inverter 26, such that is may charge the DC voltage link 12 out of the AC power grid 7, the battery 9 may also be charged out of the DC voltage link 12. When operating the switches 24 and 25, there is no need to be considerate of the sensitivity of the battery 9 with regard to ripple currents as the battery is protected by the magnetically coupled chokes 17 and 20, even if these chokes are comparatively small as long as their transfer factor is at least essentially equal to their leakage inductance divided by their main inductance plus 1. The electric power available in the entire system may be freely distributed by superimposing a power flow between the DC voltage link 12 and the AC power grid 7 which is defined by how the inverter 29 is operated, and a power flow between the two DC voltage sources 7 and 5 which is defined by how the switches 24 and 25 are operated.

In the circuitry arrangement 1, an additional two-pole connector 32 is provided for connecting additional DC voltage sources to the positive pole 11 and the negative pole 15 of the DC voltage link 12. Here, the additional DC voltage sources may be individually connected to the connector 32, either directly or via associated DC/DC converters. Further, a pair of two additional DC voltage sources 4, 5 may be connected to the DC voltage link 12 via additional coupled chokes 17, 20 and an additional pair of parallel circuits each comprising or consisting of a switch 24 or 25 and a diode 26 or 27 to be able to also control the power flow between these two additional DC voltage sources 4, 5.

Additionally or alternatively, further voltage sources may be connected to the DC voltage link 12 or any of the connectors 2, 3, either directly or via further DC/DC converters.

Figure 2:
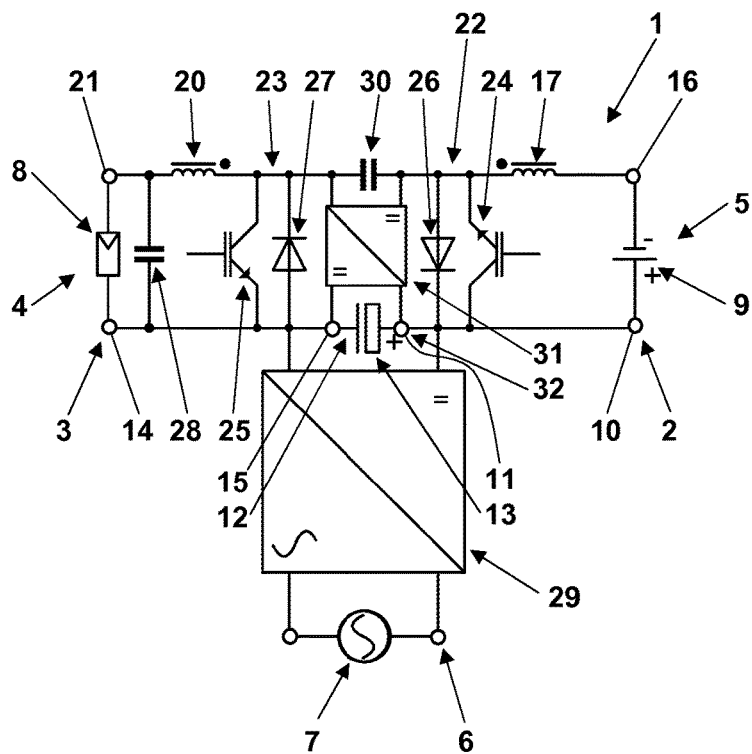
FIG. 2 is a principle circuit diagram of a second embodiment of the circuitry arrangement of the present disclosure.

The circuitry arrangement 1 depicted in FIG. 2 is consistent with the embodiment according to FIG. 1 to a much farther extent than it looks at a first sight. This fact is underlined by same reference numerals for functionally equivalent components. The following differences are nevertheless present: The parallel circuit 22 of the switch 24 and of the diode 26 is not directly connected to the other parallel circuit 23 of the switch 25 and the diode 27 but via a capacitor 30 and thus by a connection electrically conductive for alternating currents only. Correspondingly, the chokes 17 and 20 and also the minus pole 16 of the connector 2 and the plus pole 21 of the connector 3 are separated by the capacitor 30. In return, a DC/DC converter 31 is provided between the capacitor 30 and the link capacitor 13. The DC/DC converter 31 allows for a current flowing across the capacitor 30, as it, for example, occurs in passive operation of the circuitry arrangement. i.e. without operating the switches 24 and 25, and thus with any pure series connection of the DC voltage sources 4 and 5 for feeding the DC voltage link 12. The DC/DC converter 31 here only transfers a small power, as the voltage which drops over the capacitor 30 remains small, and thus, the DC/DC converter 31 may be kept small.

Due to the capacitor 30, the circuitry arrangement 1 in the embodiment according to FIG. 2 has a certain similarity to a bidirectional Cuk-converter whose two chokes are also often magnetically coupled. In the circuitry arrangement 1 of the present disclosure, however, the link capacitor 13 is additionally provided between the connectors 10 and 14, and the DC/DC converter 31 is additionally provided between the capacitor 30 and the link capacitor 13.

A further difference of the embodiment according to FIG. 2 with regard to the embodiment according to FIG. 1 is that the battery 9, i.e. the DC voltage source 5, is connected to the connector 2 in FIG. 2, whereas the photovoltaic generator 8, i.e. the DC voltage source 4, is connected to the connector 3. Correspondingly, the buffer capacitor 28 is also relocated to the connector 3 such that it is not in parallel to the battery 9. This relocation of the DC voltage sources 4 and 5 with regard to the connectors 2 and 3 has no influence on the basic function of the circuitry arrangement 1, and it (inclusive of the relocation of the buffer capacitor 28) could also be made in the embodiment according to FIG. 1. By removing the capacitor 3 and the DC/DC converter 31 from the embodiment according to FIG. 2 one gets back to the embodiment according to FIG. 1 (except of the position of the buffer capacitor 28 and the connected DC voltage sources 4 and 5). From the depiction in FIG. 2, the function of the chokes 17 and 20, of the switches 24 and 25 and of the diodes 26 and 27 in transferring power from the photovoltaic generator 8 to the battery 9 may perhaps be understood more easily.

The embodiment of the circuitry arrangement 1 according to FIG. 2 allows for a more flexible selection of the operating voltages of the DC voltage link 12 and/or of the battery 9 and the further voltage source 4, as the link voltage needs not to be exactly the sum of the two source voltages. Instead, differences between the link voltage and the sum of the two source voltages may be compensated by adjusting a DC voltage across the capacitor 30 by means of the DC/DC converter 31.

Many variations and modifications may be made to the embodiments of the disclosure without departing substantially from the spirit and principles of the disclosure. All such modifications and variations are intended to be included herein within the scope of the present disclosure, as defined by the following claims.

The invention claimed is:

1. A circuitry arrangement for connecting a battery and a further voltage source to a common DC voltage link, comprising:

a DC voltage link having a plus pole and a minus pole, a two-pole connector for the battery, the connector for the battery having a plus pole and a minus pole, and a two-pole connector for the further voltage source, the connector for the further voltage source having a plus pole and a minus pole, wherein the plus pole of one of the two connectors is directly connected to the plus pole of the DC voltage link, and the minus pole of the other of the two connectors is directly connected to the minus pole of the DC voltage link, wherein the plus pole of the one of the two connectors is connected to the minus pole of the one of the two connectors via a first parallel circuit consisting of a first switch and a first anti-parallel diode oriented in blocking direction and via a first choke connected in series with the first parallel circuit, wherein the minus pole of the other of the two connectors is connected to the plus pole of the other of the two connectors via a second parallel circuit consisting of a second switch and a second anti-parallel diode oriented in blocking direction and via a second choke connected in series with the second parallel circuit, wherein a connection that is electrically conductive at least for alternating currents is provided between a choke end of the first parallel circuit and a choke end of the second parallel circuit, and wherein the first choke and the second choke are magnetically coupled, wherein winding senses of windings of the first choke and the second choke on a common magnetic core are equal as viewed from the connection of the choke ends of the first parallel circuit and the second parallel circuit.

2. The circuitry arrangement of claim 1, wherein a transfer factor of the magnetically coupled first and second chokes is essentially equal to a leakage inductance of the magnetically coupled first and second chokes divided by a main inductance of the magnetically coupled first and second chokes plus 1.

3. The circuitry arrangement of claim 1, wherein the choke end of the first parallel circuit is directly connected to the choke end of the second parallel circuit.

4. The circuitry arrangement of claim 1, wherein the choke end of the first parallel circuit is connected to the choke end of the second parallel circuit via a capacitor.

5. The circuitry arrangement of claim 4, wherein a DC/DC converter is connected between the capacitor and the DC voltage link.

6. The circuitry arrangement of claim 5, wherein the DC voltage link comprises a link capacitor.

7. The circuitry arrangement of claim 1, wherein the DC voltage link comprises a link capacitor.

8. The circuitry arrangement of claim 1, wherein a buffer capacitor is connected between the plus pole and the minus pole of the connector for the further voltage source.

9. The circuitry arrangement of claim 1, wherein a buffer capacitor is connected between the minus poles of both of the two connectors.

10. The circuitry arrangement of claim 1, wherein a buffer capacitor is connected between the plus poles of both of the two connectors.

11. The circuitry arrangement of claim 9, wherein the buffer capacitor is not connected to that pole of the connector for the battery which is connected to the first or second choke.

12. The circuitry arrangement of claim 10, wherein the buffer capacitor is not connected to that pole of the connector for the battery which is connected to the first or second choke.

13. The circuitry arrangement of claim 1, wherein an inverter is connected to the DC voltage link, the inverter being supplied out of the DC voltage link and configured to feed an alternating current into an AC power grid.

14. The circuitry arrangement of claim 13, wherein the inverter is a bidirectional inverter.

15. The circuitry arrangement of claim 1, wherein an additional two-pole connector is provided for connecting an additional DC voltage source to the DC voltage link.

* * * * *